US010459969B2

(12) United States Patent
Nomura

(10) Patent No.: US 10,459,969 B2
(45) Date of Patent: Oct. 29, 2019

(54) INFORMATION COLLECTION SYSTEM AND INFORMATION CENTER

(71) Applicant: Masakazu Nomura, Nagoya (JP)

(72) Inventor: Masakazu Nomura, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 250 days.

(21) Appl. No.: 15/493,930

(22) Filed: Apr. 21, 2017

(65) Prior Publication Data

US 2017/0308551 A1 Oct. 26, 2017

(30) Foreign Application Priority Data

Apr. 26, 2016 (JP) .................................. 2016-088307

(51) Int. Cl.
*G06F 16/583* (2019.01)
*G06F 16/51* (2019.01)
*G06K 7/14* (2006.01)
*G06K 9/00* (2006.01)
*G06K 9/03* (2006.01)
*G06K 9/18* (2006.01)
*G06K 9/32* (2006.01)
(Continued)

(52) U.S. Cl.
CPC .......... *G06F 16/5846* (2019.01); *G06F 16/50* (2019.01); *G06F 16/51* (2019.01); *G06F 16/5838* (2019.01); *G06K 7/1417* (2013.01); *G06K 9/00791* (2013.01); *G06K 9/03* (2013.01); *G06K 9/18* (2013.01); *G06K 9/3258* (2013.01); *G06K 19/06037* (2013.01);
(Continued)

(58) Field of Classification Search
CPC .. G06F 16/5846; G06F 16/5838; G06F 16/51; G06F 16/50; G06K 7/1417; G06K 9/00791; G06K 9/03; G06K 9/18
See application file for complete search history.

(56) References Cited

U.S. PATENT DOCUMENTS 6,363,161 B2 * 3/2002 Laumeyer .......... G06K 9/00818
382/104
7,451,041 B2 * 11/2008 Laumeyer .............. G01C 21/30
701/420
(Continued)

FOREIGN PATENT DOCUMENTS

JP 2004-295198 A 10/2004
JP 2005-141348 A 6/2005
(Continued)

*Primary Examiner* — Kim Y Vu
*Assistant Examiner* — Molly Delaney
(74) *Attorney, Agent, or Firm* — Dinsmore & Shohl LLP

(57) ABSTRACT

Each of vehicles acquires its own position, and transmits an image of a nearby outside taken by an own camera and a piece of information of the own position. An information center communicatable wirelessly with the vehicles receives the images and the pieces of information of the vehicles' positions transmitted by the vehicles, and recognizes pieces of first character information appearing in the received images, respectively. Based on the received pieces of information of the vehicles' positions as well as at least either points of interest or areas stored as collection target information, the information center determines at least either points of interest or areas for the recognized pieces of first character information, respectively, and stores association information where the pieces of first character information are associated with the determined at least either points of interest or areas.

10 Claims, 9 Drawing Sheets

(51) Int. Cl.
  *G06K 19/06* (2006.01)
  *G10L 15/26* (2006.01)
  *H04N 1/00* (2006.01)
  *H04N 1/21* (2006.01)
  *H04N 5/232* (2006.01)
  *G06F 16/50* (2019.01)

(52) U.S. Cl.
  CPC ....... *G10L 15/265* (2013.01); *H04N 1/00103* (2013.01); *H04N 1/00244* (2013.01); *H04N 1/2112* (2013.01); *H04N 5/23203* (2013.01); *G06K 2209/01* (2013.01); *H04N 5/23206* (2013.01); *H04N 2201/3215* (2013.01); *H04N 2201/3252* (2013.01); *H04N 2201/3253* (2013.01); *H04N 2201/3264* (2013.01); *H04N 2201/3266* (2013.01); *H04N 2201/3269* (2013.01)

(56) References Cited

U.S. PATENT DOCUMENTS

| | | | | |
|---|---|---|---|---|
| 8,504,297 | B2* | 8/2013 | Chiba | G01C 21/3673 340/995.15 |
| 9,569,676 | B2* | 2/2017 | Yesugade | G06K 9/18 |
| 2009/0169055 | A1* | 7/2009 | Ishikawa | G01C 21/32 382/104 |
| 2014/0132769 | A1* | 5/2014 | Kido | G06K 9/00791 348/148 |
| 2014/0149094 | A1* | 5/2014 | Takeuchi | G06K 9/00778 703/6 |
| 2016/0117562 | A1* | 4/2016 | Chung | G06K 9/00818 382/104 |
| 2017/0008521 | A1* | 1/2017 | Braunstein | G01C 21/32 |
| 2017/0236015 | A1* | 8/2017 | Hattori | G06K 9/00818 382/103 |
| 2018/0025235 | A1* | 1/2018 | Fridman | G08G 1/096725 382/103 |

FOREIGN PATENT DOCUMENTS

| | | | |
|---|---|---|---|
| JP | 2006-078357 A | 3/2006 | |
| JP | 2007-240193 A | 9/2007 | |
| JP | 2008-165652 A | 7/2008 | |
| JP | 2010-140420 A | 6/2010 | |
| JP | 2010231560 A | 10/2010 | |
| JP | 2013-239087 A | 11/2013 | |
| WO | WO-2016130719 A2 * | 8/2016 | ............ G01C 21/32 |

* cited by examiner

<B DEPARTMENT STORE EVENT>
YOU CAN FIND DELICIOUS FOODS AND
GOOD THINGS OF KYUSHU.
SUMMER LARGE EXHIBITION OF KYUSHU
FROM AUGUST XX (WED) THRU YY (MON)

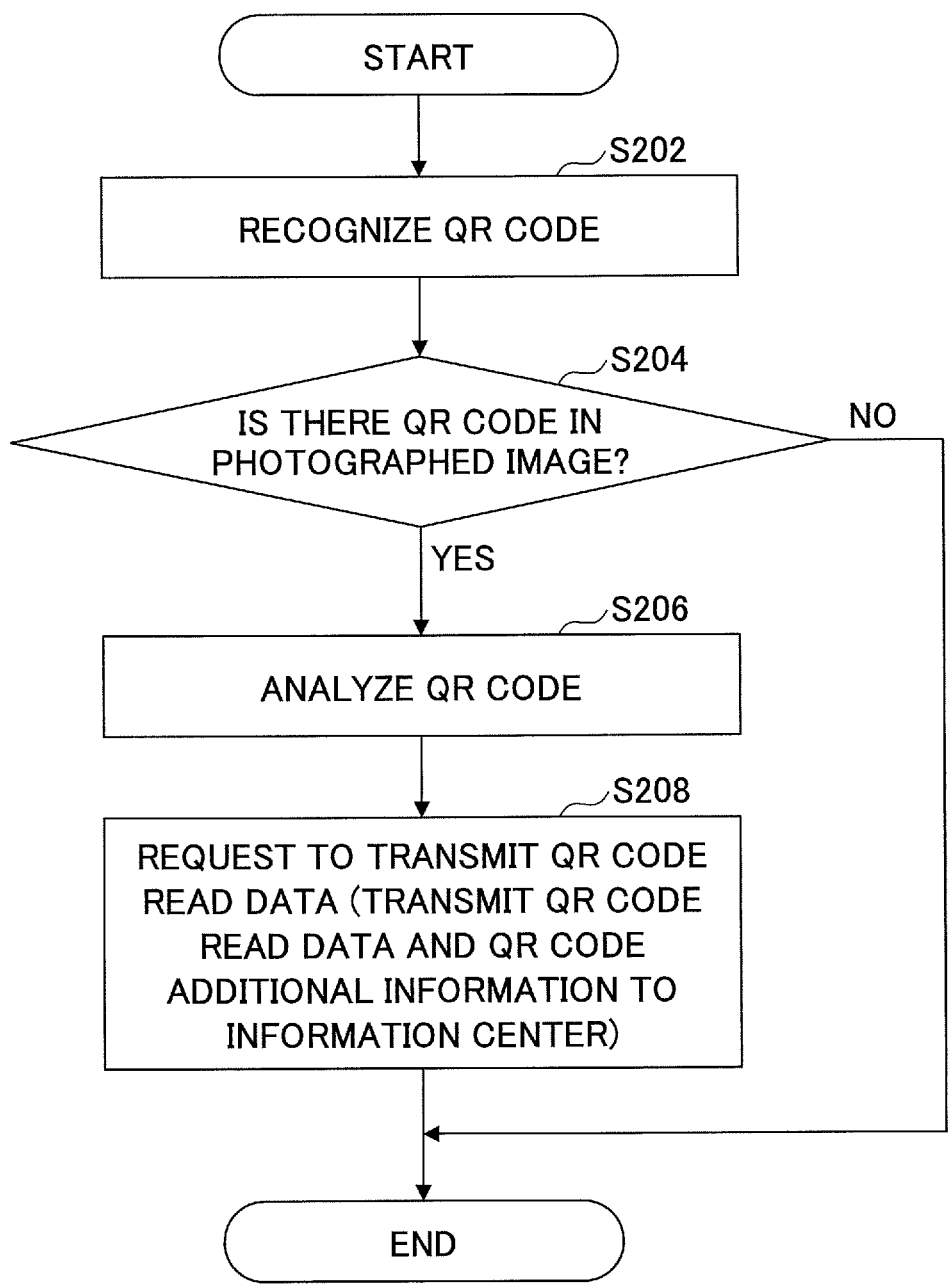

INFORMATION COLLECTION SYSTEM AND INFORMATION CENTER

CROSS-REFERENCE TO RELATED APPLICATIONS

The present application claims the benefit of priority of Japanese Priority Application No. 2016-088307, filed on Apr. 26, 2016, the entire contents of which are hereby incorporated herein by reference.

BACKGROUND

1. Technical Field

The present disclosure relates to an information collection system and an information center.

2. Description of the Related Art

An information collection system for storing images taken by cameras of vehicles has been known (for example, see Japanese Laid-Open Patent Application No. 2013-239087).

According to Japanese Laid-Open Patent Application No. 2013-239087, images taken by cameras of vehicles are stored, and useful images selected from the stored images are provided to vehicles.

SUMMARY

According to one aspect of the present disclosure, an information collection system includes a plurality of vehicles. Each of the vehicles includes one or more processors configured to acquire a position of the vehicle, and transmit an image of a nearby outside taken by a camera included in the vehicle and a piece of information of the position of the vehicle acquired when the image is taken. The information collection system further includes an information center wirelessly communicatable with the vehicles, respectively. The information center includes one or more processors configured to receive the images and the pieces of information of the positions of the vehicles from the vehicles, respectively, and recognize pieces of first character information appearing in the received images, respectively. The one or more processors of the information center are further configured to, based on the received pieces of information of the positions of the vehicles as well as at least either points of interest or areas stored as collection target information, determine at least either points of interest or areas for the recognized pieces of first character information, respectively, and store pieces of association information where the pieces of first character information are associated with the determined at least either points of interest or areas, respectively.

Other objects, features and advantages will become more apparent from the following detailed description when read in conjunction with the accompanying drawings.

BRIEF DESCRIPTION OF THE DRAWINGS

FIG. 4 is a flowchart generally illustrating one example of a process (a QR code reading process) to acquire QR code read data (second character information) from a QR code appearing in a photographed image;

DETAILED DESCRIPTION OF EMBODIMENTS

According to Japanese Laid-Open Patent Application No. 2013-239087 mentioned above, it is possible to prevent useless images from being provided to users. However, stored images are provided to users as they are, and therefore, the users may be not able to use information shown in the images effectively. For example, an image provided to a user may show a POI (Point Of Interest) of a shop that a user is interested in, a signboard or a banner concerning an event for a certain area, and so forth. However, it may be difficult for the user to immediately understand in which type the shop is, in which area the event will be held, and so forth. Especially, when an image is provided to a vehicle's driver or an occupant during traveling, it may be desired that the information indicated by a signboard, banner, or the like, shown in the image, can be immediately understood by the driver or the occupant. Otherwise, the vehicle may actually be far away from the corresponding shop, area, or the like, when the driver or the occupants have understood the information indicated by the signboard, banner, or the like. Thus, according to the technology disclosed by Japanese Laid-Open Patent Application No. 2013-239087, it may be actually difficult for users to effectively use information appearing in provided images.

In consideration of the point, an object of the present disclosure is to provide an information collection system with which it is possible to store pieces of information appearing in photographed images taken by cameras of vehicles in such a manner that users can use the information more effectively.

Below, embodiments will be described using the accompanying drawings.

Figure 1:
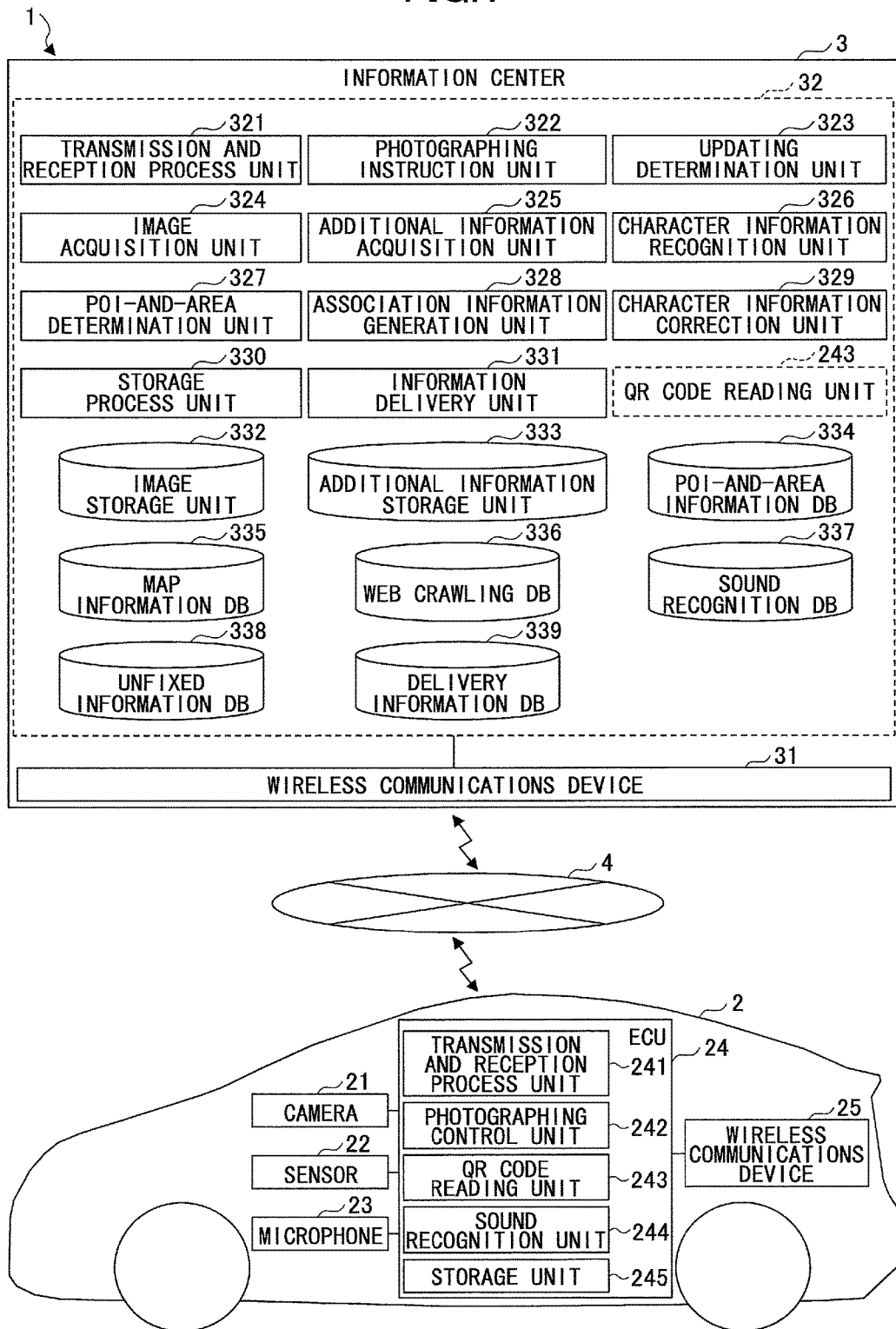
FIG. 1 generally illustrates one example of a configuration of an information collection system.

FIG. 1 generally illustrates one example of a configuration of an information collection system 1 according to an embodiment. The information collection system 1 includes a plurality of vehicles 2 and an information center 3. The information center 3 and each of the vehicles 2 are bidirectionally connected via, for example, a communications network 4 such as a cellular phone network. Below, description will be made assuming that the vehicles 2 have the same or similar configurations.

Each vehicle 2 includes a camera 21, a sensor 22, a microphone 23, an ECU (Electronic Control Unit) 24, and a wireless communications device 25.

The camera 21 photographs an outside near the vehicle 2 in a certain range in response to an operation instruction from the ECU 24 (actually, a photographing control unit 242, described later). An image (photographed image data) taken by the camera 21 is transmitted to the ECU 24 via an on-vehicle network such as a 1-to-1 communications line or a CAN (Controller Area Network), and is temporarily stored in a storage unit 245 described later.

The sensor 22 detects various states of the vehicle 2 (vehicle states). The sensor 22 includes a GPS sensor that detects the position of the vehicle 2, an angular acceleration sensor (i.e., a gyro sensor) that detects angular accelerations along the three axes of the vehicle 2 (i.e., the forward and backward axis, the left and right axis, and the vertical axis), and so forth. Data (vehicle state data) detected by the sensor 22 is transmitted to the ECU 24 via an on-vehicle network such as a 1-to-1 communications line or a CAN (Controller Area Network).

The microphone 23 is installed in the vehicle cabin, and acquires sounds of occupants (including the driver) of the vehicle 2 in response to an operation instruction from the ECU 24 (actually, a sound recognition unit 244 described later). The sounds acquired by the microphone 23 are transmitted to the ECU 24 via an on-vehicle network such as a 1-to-1 communications line or a CAN (Controller Area Network).

The ECU 24 carries out control operations concerning acquisition of various sorts of data to be transmitted to the information center 3, and transmission of the acquired information to the information center 3. The ECU 24, for example, includes a microcomputer, and implements various control processes by executing various programs stored in a ROM (Read-Only Memory). The ECU 24 includes, as functional units implemented as a result of a CPU (Central Processing Unit) executing the various programs stored in the ROM, a transmission and reception process unit 241, a photographing control unit 242, a QR code reading unit 243, and a sound recognition unit 244. Also, the ECU 24 includes, as a storage area prepared in an internal nonvolatile memory, a storage unit 245.

The transmission and reception process unit 241 transmits signals to the information center 3 and receives signals transmitted from the information center 3, through the wireless communications device 25.

The transmission and reception process unit 241 transmits the position of the vehicle 2 (for example, information such as latitude and longitude information) to the information center 3 successively based on data that is input from the GPS sensor included in the sensor 22.

Also, in response to receiving a signal to request to photograph a nearby outside of the vehicle 2 using the camera 3 from the information center 3, the transmission and reception process unit 241 sends the request to the photographing control unit 242.

Also, in response to a transmission request from the photographing control unit 242, the transmission and reception process unit 241 transmits image data photographed by the camera 21 and corresponding additional information (i.e., image additional information) to the information center 3. The image additional information includes the time when the photographed image is taken, the position of the vehicle 2, the angular acceleration information of the vehicle 2, and so forth, acquired when the photographed image is taken, camera information (i.e., the position in the vehicle where the camera 21 is installed, the installation angle, the angle of field, and so forth, of the camera 21).

Also, in response to a transmission request from the QR code reading unit 243, the transmission and reception process unit 241 transmits QR code read data and additional information corresponding to the QR code read data (i.e., QR code additional information) to the information center 3. The QR code additional information includes the time when the photographed image corresponding to the QR code read data is taken, the position of the vehicle 2, the angular acceleration information of the vehicle 2, and so forth, acquired when the photographed image is taken.

Also, in response to a transmission request from the sound recognition unit 244, the transmission and reception process unit 241 transmits sound recognized data and additional information corresponding to the sound recognized data (i.e., sound additional information) to the information center 3. The sound additional information includes the time when the sound data corresponding to the sound recognized data is acquired, the position of the vehicle 2 acquired when the sound data is acquired, and so forth.

The photographing control unit 242 controls the camera 21. Actually, when the transmission and reception process unit 241 has received a photographing request from the information center 3, the photographing control unit 242 responds to the photographing request to transmit an operation instruction to the camera 21. In more detail, the photographing control unit 242 transmits an operation instruction corresponding to the contents of the instruction included in the photographing request (for example, timing to start and end photographing, the position to photograph, and so forth). Below, with reference to FIG. 2, a process flow of the photographing control unit 242 to control photographing will be described.

Figure 2:
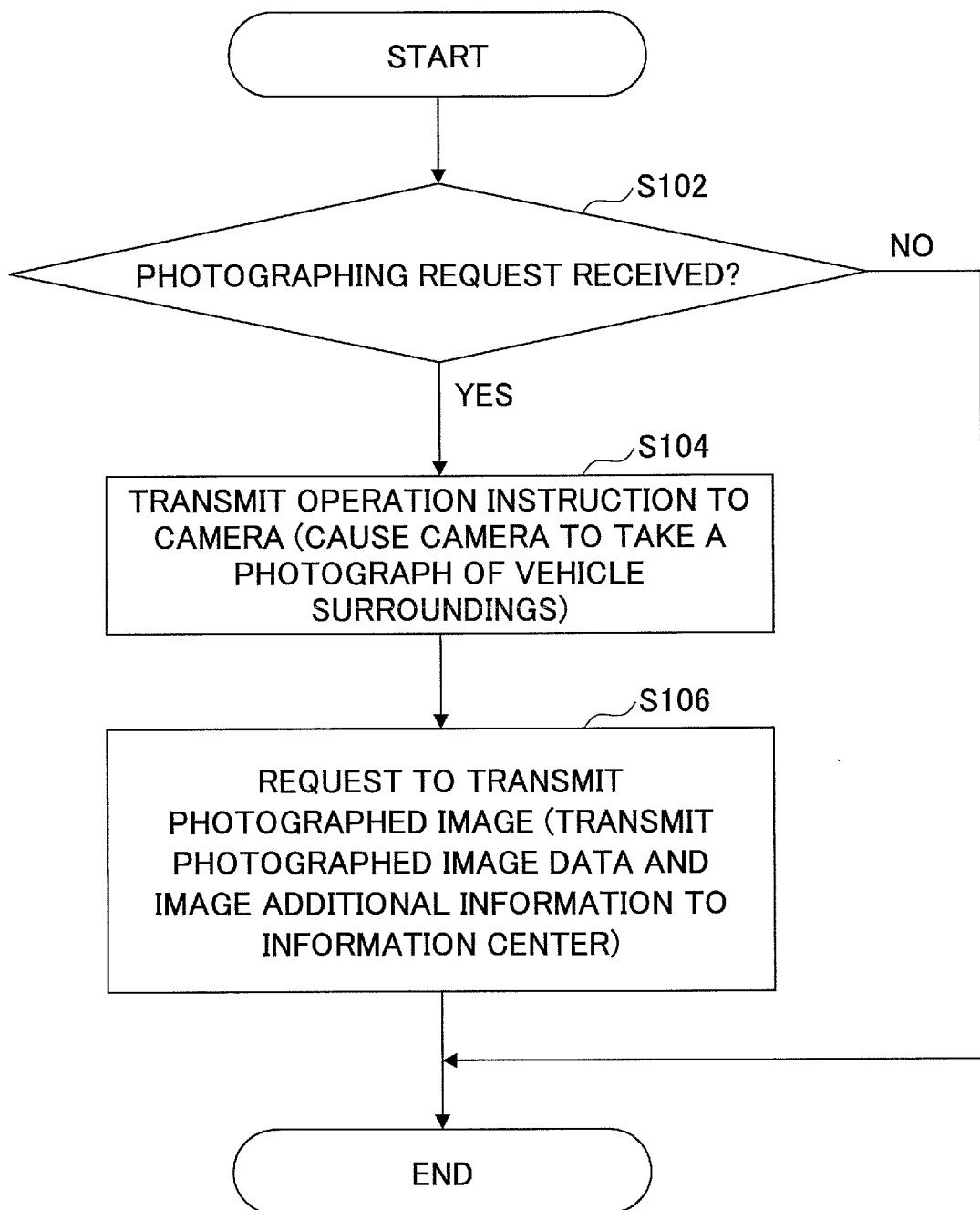
FIG. 2 is a flowchart generally illustrating one example of a photographing control process carried out by a vehicle (i.e., a photographing control unit)

FIG. 2 is a flowchart generally illustrating one example of a control process carried out by the photographing control unit 242. The process of the flowchart is repetitiously carried out every certain time interval, during, for example, a period of time starting from the completion of an initial process carried out after ignition ON (IG-ON) of the vehicle 2 and ending at ignition OFF (IG-OFF).

In step S102, the photographing control unit 242 determines whether the transmission and reception process unit 241 has received a photographing request from the information center 3. When the transmission and reception process unit 241 has received a photographing request from the information center 3, the photographing control unit 242 proceeds to the step S104. When the transmission and reception process unit 241 has not received a photographing request from the information center 3, the photographing control unit 242 ends the current process.

In step S104, the photographing control unit 242 transmits an operation instruction corresponding to the instruction contents of the photographing request to the camera 21. Thereby, the camera 21 photographs a situation near the vehicle 2 during the period of time for the traveling zone according to the operation instruction.

In step S106, the photographing control unit 242 transmits a transmission request, to transmit the photographed image data of the camera 21 to the information center 3, to the transmission and reception process unit 241, and ends the current process. Thus, the transmission and reception process unit 241 transmits the photographed image data and the image additional information to the information center 3.

Returning to FIG. 1, the QR code reading unit 243 recognizes a QR code appearing in the photographed image of the camera 21. Also, the QR code reading unit 243 analyzes the recognized QR code, to acquire QR code read data (second character information). Below, with reference to FIGS. 3A, 3B, and 4, an actual example of a QR code reading process of the QR code reading unit 243, and a process flow in the QR code reading unit 243 will be described.

Figures 3A, 3B:
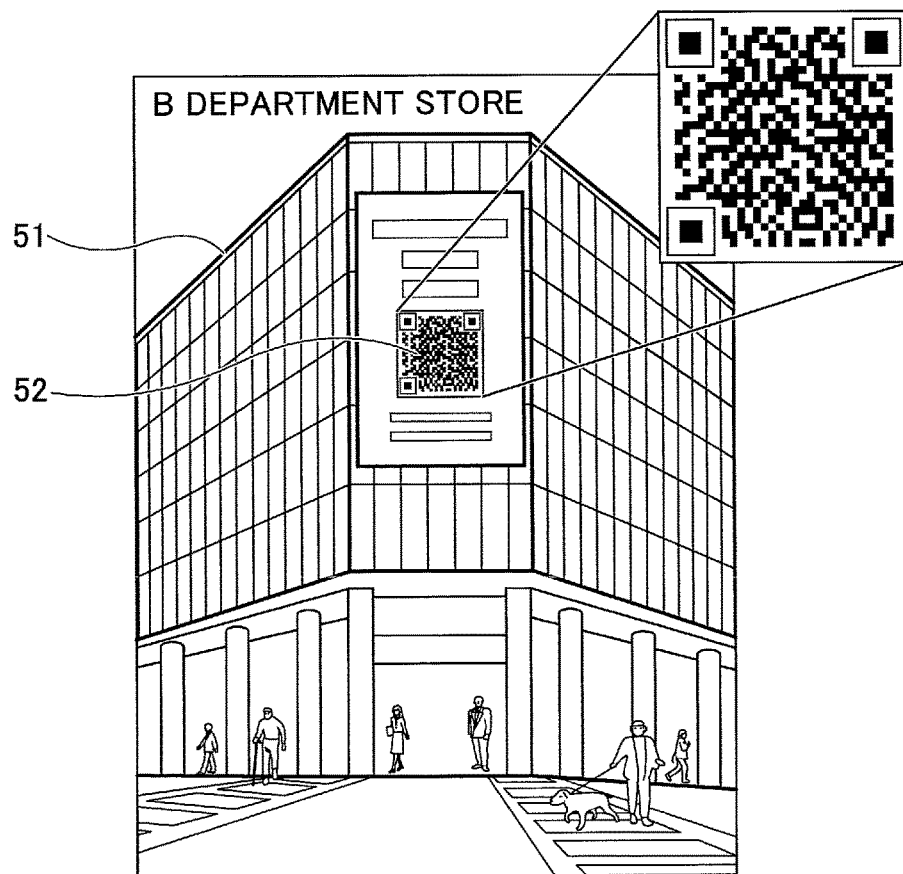
FIGS. 3A and 3B illustrate one example of a QR code appearing in a photographed image, and one example of QR code read data (second character information)

First, FIG. 3A illustrates one example of a QR code appearing in a photographed image, and FIG. 3B illustrates one example of corresponding QR code read data (second character information).

In the example of FIG. 3A, the front of a B department store 51, facing an intersection, appears in a photographed image of the camera 21. Then, approximately at the center of the photographed image, an advertisement that includes a relatively large QR code 52 of the B department store 51 appears. The QR code reading unit 243 recognizes the QR code 52 appearing in the photographed image illustrated in FIG. 3A, analyzes the QR code 52, and acquires the QR code read data illustrated in FIG. 3B.

In the example of FIG. 3B, the QR code read data is text data concerning an event of the B department store 51. Actually, the QR code read data has the contents "<B DEPARTMENT STORE EVENT> YOU CAN FIND DELICIOUS FOODS AND GOOD THINGS OF KYUSHU. SUMMER LARGE EXHIBITION OF KYUSHU FROM AUGUST XX (WED) THRU YY (MON)".

Next, FIG. 4 is a flowchart generally illustrating one example of a process to acquire QR code read data (second character information) from a QR code appearing in a photographed image (a QR code reading process). The process of the flowchart is carried out, for a photographed image, for example, each time immediately after the photographed image of the camera 21 is stored in the storage unit 245.

In step S202, the QR code reading unit 243 tries to recognize a QR code of a photographed image acquired from the storage unit 245.

In step S204, the QR code reading unit 243 determines whether any QR code appears in the photographed image. If a QR code appears in the photographed image, the QR code reading unit 243 proceeds to step S206. If no QR code appears in the photographed image, the QR code reading unit 243 ends the current process.

In step S206, the QR code reading unit 243 analyzes the recognized QR code to acquire QR code read data.

In step S208, the QR code reading unit 243 transmits a transmission request, to transmit the QR code read data to the information center 3, to the transmission and reception process unit 241, and ends the current process. Thus, the transmission and reception process unit 241 transmits the QR code read data and the corresponding QR code additional information to the information center 3.

Returning to FIG. 1, the sound recognition unit 244 responds to a predetermined operation of a user to activate the microphone 23, carry out a sound recognition process on sound data acquired by the microphone 23, and generate sound recognized data. Then, after acquiring the sound recognized data, the sound recognition unit 244 transmits a transmission request, to transmit the sound recognized data to the information center 3, to the transmission and reception process unit 241. For example, when the user of the vehicle 2 has found useful information near the vehicle 2, the user of the vehicle 2 performs the predetermined operation and murmurs the contents of the useful information. As a result, the sound recognition unit 244 uploads the sound recognized data (text data) corresponding to the murmur to the information center 3, and the information can be thus shared with other users.

The storage unit 245 temporarily stores a photographed image of the camera 21 in response to an instruction from the photographing control unit 242.

The wireless communications device 25 carries out wireless communications with the information center 3 via the communications network 4, and includes, for example, a DCM (Data Communication Module).

The information center 3 is installed remotely from the vehicles 2, and is configured to be able to bidirectionally carry out wireless communications with the vehicles 2, respectively. The information center 3 includes a wireless communications device 31 and an information collection apparatus 32.

The wireless communications device 31 can be any device for carrying out wireless communications with each of the vehicles 2 via the communications network 4.

The information collection apparatus 32 collects information concerning predetermined POIs (hereinafter, referred to as "target POIs") and predetermined areas (hereinafter, referred to as "target areas"). Generally speaking, the information collection apparatus 32 generates information (i.e., "delivery information", or "association information" described later) concerning the target POIs and the target areas from photographed image data, QR code read data, and so forth, transmitted from vehicles 2 (actually, the corresponding transmission and reception process units 241), and stores the generated delivery information.

Also, the information collection apparatus 32 acquires photographed image data, QR code data, and so forth, for monitoring, from the relatively small number of vehicles 2 from among vehicles 2 traveling near each target POI and each target area, for example, generates the delivery information for monitoring, and stores the delivery information for monitoring for each target POI and each target area.

Then, if it is determined that the stored delivery information for monitoring for a target POI or a target area has a change more than a predetermined amount, an updating determination unit 323 (described later) determines to update the delivery information for the target POI or the target area. In response, the information collection apparatus 32 acquires photographed image data, QR code data, and so forth, from the relatively large number of vehicles 2 traveling near the target POI or the target area, for example, generates the latest delivery information for the target POI or the target area, and stores the generated latest delivery information in a manner of adding the generated information or updating the exiting information with the generated information. Thus, the delivery information for being actually delivered by an information delivery unit 331 (described later) for the target POI or the target area is updated.

Thus, the information collection apparatus 32 generates and stores the delivery information for monitoring, and also, generates and stores the delivery information for being actually delivered to vehicles 2 or the like by the information delivery unit 331 through a transmission and reception process unit 321 (described later).

The information collection apparatus 32 includes, for example, one or more computers. The information collection apparatus 32 includes the transmission and reception process unit 321, a photographing instruction unit 322, the updating determination unit 323, an image acquisition unit 324, an additional information acquisition unit 325, a character information recognition unit 326, a POI-and-area determination unit 327, an association information generation unit 328, a character information correction unit 329, and a storage process unit 330.

Also, the information collection apparatus 32 includes the information delivery unit 331, an image storage unit 332, an additional information storage unit 333, a POI-and-area information DB 334, a map information DB 335, a web crawling DB 336, a sound recognition DB 337, an unfixed information DB 338, and a delivery information DB 339.

Note that, the information concerning the target POIs and the target areas is previously stored in the POI-and-area information DB 334. When the target POIs and the target areas have been updated (some have been added, some have been deleted, and so forth), the information concerning the target POIs and the target areas is updated.

The transmission and reception process unit 321 transmits signals to the vehicles 2 and receive signals from the vehicles through the wireless communications device 31.

When the transmission and reception process unit 321 has received photographed image data and image additional information, the transmission and reception process unit 321 sends information indicating this fact to the image acquisition unit 324, and stores the received photographed image data and image additional information in the image storage unit 332 and the additional information storage unit 333, respectively.

Also, when the transmission and reception process unit 321 has received QR code read data and QR code additional information from a vehicle 2, the transmission and reception process unit 321 sends information indicating this fact to the storage process unit 330.

Also, when the transmission and reception process unit 321 has received sound recognized data and sound additional information from a vehicle 2, the transmission and reception process unit 321 stores the sound recognized data in the sound recognition DB 337 in a predetermined format, and stores the sound additional information in the additional information storage unit 333.

Also, when the transmission and reception process unit 321 has received a transmission request from the photographing instruction unit 322, the transmission and reception process unit 321 transmits the photographing requests to vehicles 2 designated by the transmission request.

When the transmission and reception process unit 321 has received a delivery request from the information delivery unit 331, the transmission and reception process unit 321 transmits the delivery information to vehicles 2 designated by the delivery request, registered smartphones of the users of the designated vehicles, or the like.

The photographing instruction unit 322 transmits a transmission request to the transmission and reception process unit 321 according to predetermined conditions, to transmit photographing requests to vehicles 2 designated by the transmission request through the transmission and reception process unit 321.

For example, for each target area and each target POI, if the updating determination unit 323 does not determine to update the delivery information, the photographing instruction unit 322 transmits the photographing requests to the relatively small number of vehicles 2 selected according to a predetermined rule from among vehicles 2 traveling near the target area or the target POI, periodically, for example. As a result, the photographing instruction unit 322 finally acquires the corresponding photographed image data, QR code read data, and so forth for monitoring, with which the above-mentioned delivery information for monitoring is generated and stored.

On the other hand, if the updating determination unit 323 determines, based on, for example, the corresponding delivery information for monitoring stored, to update the delivery information for a target POI or a target area, the photographing instruction unit 322 transmits the photographing requests to the relatively large number of vehicles 2 selected according to a predetermined rule from among vehicles 2 traveling near the target area or the target POI. As a result, the photographing instruction unit 322 finally acquires the corresponding photographed image data, QR code read data, and so forth for keeping the delivery information in the latest state.

That is, the latest delivery information is generated using the thus acquired photographed image data, QR code read data, and so forth for keeping the delivery information in the latest state, and is stored in such a manner that the generated information is added or the exiting information is updated with the generated information.

Thus, the delivery information for being actually delivered by the information delivery unit 331 is updated for each target POI and each target area.

The photographing requests include instruction contents such as timings to start and end photographing, the places to photograph, and so forth.

The updating determination unit 323 determines whether to update the delivery information stored in the delivery information DB 339. For example, the updating determination unit 323 periodically compares, in a time-series manner, the above-mentioned delivery information for monitoring stored in the delivery information DB 339, to acquire the difference in the delivery information for monitoring between different time points, for each target POI and each target area. Then, the updating determination unit 323 determines, based on the acquired difference, whether to update the delivery information for the target POI or the target area.

The image acquisition unit 324 acquires the photographed image data from the image storage unit 332, and sends the photographed image data to the character information recognition unit 326.

The additional information acquisition unit 325 acquires the image additional information corresponding to the photographed image data acquired by the image acquisition unit 324 from the additional information storage unit 333, and sends the acquired image additional information to the character information recognition unit 326.

The character information recognition unit 326 recognizes character information (first character information) appearing in the photographed image acquired by the image acquisition unit 324 through a character recognition process.

The POI-and-area determination unit 327 determines a target POI or a target area concerning the character information recognized by the recognition unit 326, based on the position of the vehicle 2 acquired when the photographed image is taken included in the image additional information, and so forth.

The association information generation unit 328 generates association information where the character information (first character information) recognized by the character information recognition unit 326 is associated with the target POI and the target area determined by the POI-and-area determination unit 327.

Below, with reference to FIGS. 5A, 5B, and 6, an actual example of a POI-and-area determination process of the POI-and-area determination unit 327, and a flow of a process starting from recognition of character information and ending at generation of association information, carried out by the character information recognition unit 326, the POI-andarea determination unit 327, and the association information generation unit 328, will be described.

Figure 5A:
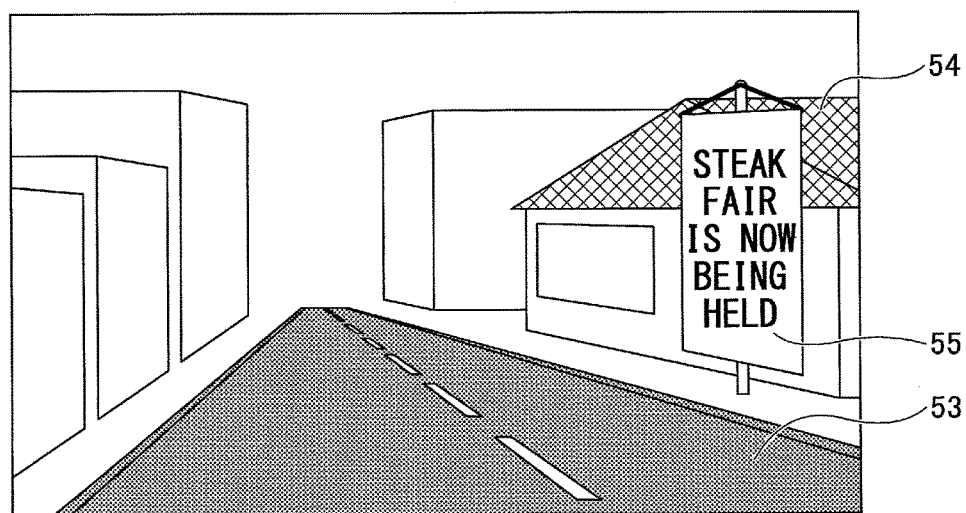
FIGS. 5A and 5B illustrate an actual example of a way to determine a POI or an area for character information carried out by an information center (a POI-and-area determination unit)
Figure 5B:
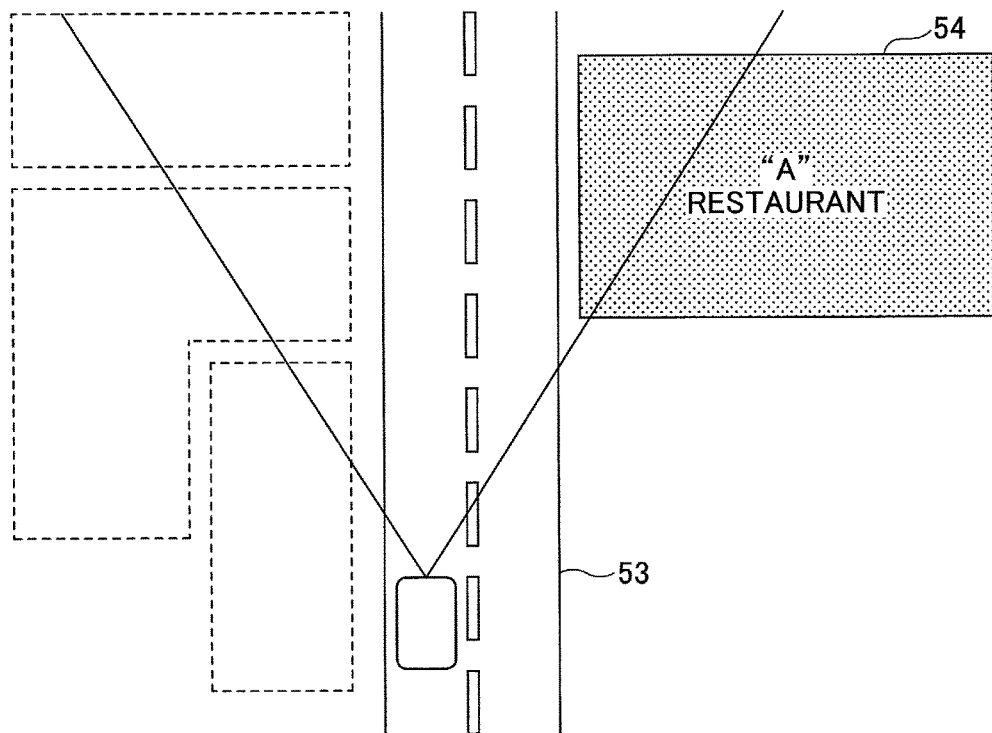

FIGS. 5A and 5B illustrate an actual example of a process of the POI-and-area determination unit 327 to determine a target POI or a target area concerning character information (first character information). FIG. 5A illustrates an actual example of a photographed image acquired by the image acquisition unit 324. FIG. 5B is a plan view illustrating a situation where the photographed image of FIG. 5A is photographed. In more detail, FIG. 5B illustrates, in a superposing manner, lines and polygons corresponding to the respective planimetric features such as the buildings and the road that are GIS (Geographic Information System) data stored in the map information DB 335, as well as the vehicle 2 and the angle-of-field information (the angle range of photographing in the left and right directions).

As illustrated in FIG. 5A, in the photographed image, a nearby situation centering on the forward direction of the vehicle 2 appears including the road 53 on which the vehicle 2 is traveling, the A restaurant 54 present along the road 53, and so forth. The banner 55 installed by the A restaurant 54 appears at a right end part of the paragraphed image, and character information "STEAK FAIR IS NOW BEING HELD" is printed on the banner 55. Therefore, the character information recognition unit 326 recognizes the character information appearing in the photographed image. Then, the POI-and-area determination unit 327 determines a target POI or a target area concerning the character information thus recognized by the character information recognition unit 326.

The POI-and-area determination unit 327 can recognize the position of the vehicle 2 acquired when the photographed image is taken, and the corresponding camera information (i.e., the angle of field of the camera 21), from the image additional information acquired by the additional information acquisition unit 325. Thus, as illustrated in FIG. 5B, the POI-and-area determination unit 327 can recognize the nearby situation of the vehicle 2 occurring when the photographed image is photographed, and identifies the appearing planimetric features such as the buildings, from the GIS data of the map information DB 335, the image additional information, and so forth.

Also, the POI-and-area determination unit 327 can determine whether the planimetric feature such as the shop or the building appearing in the photographed image corresponds to a target POI or is present in a target area, by comparing the name, or the like, of the shop or the building appearing in the photographed image, with the target POIs, the target areas, and so forth, stored in the POI-and-area information DB 334.

Thus, in the example of FIGS. 5A and 5B, the POI-and-area determination unit 327 can determine that the character information printed on the banner 55 relates to the A restaurant 54 adjacent to the banner 55.

Also, in the example of FIGS. 5A and 5B, the corresponding target POI can be determined to be a restaurant according to the contents of the character information. Therefore, it is also possible to use the contents of the character information to determine the corresponding target POI.

Figure 6:
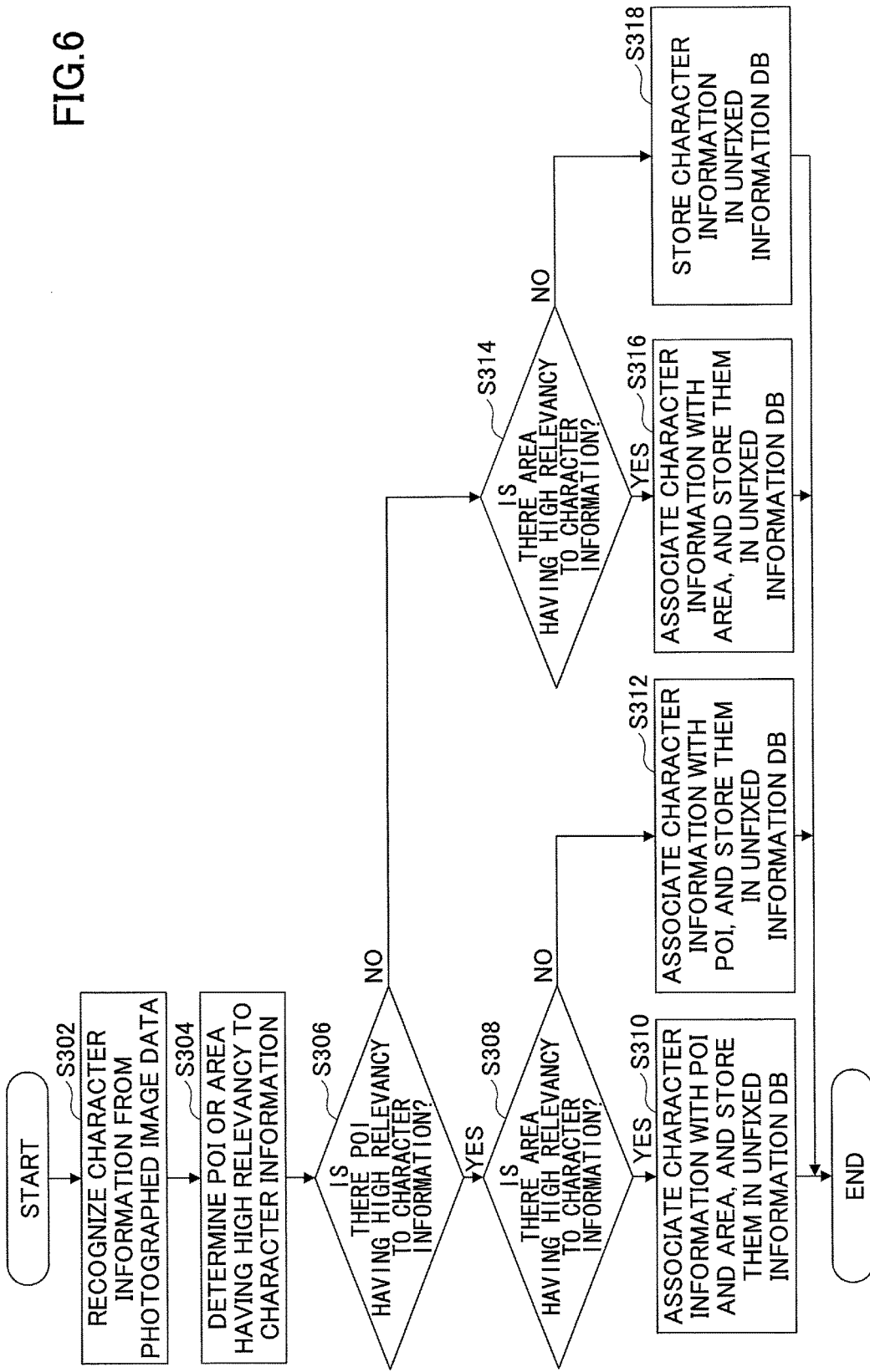
FIG. 6 is a flowchart generally illustrating one example of a process, from recognition of character information through generation of association information carried out by the information center (a character information recognition unit, the POI-and-area determination unit, and an association information generation unit)

Next, FIG. 6 generally illustrates one example of a flow of a process starting from recognition of character information and ending at generation of association information carried out by the character information recognition unit 326, the POI-and-area determination unit 327, and the association information generation unit 328. The process of the flowchart is carried out, for example, each time when the transmission and reception process unit 241 receives photographed image data and image additional information data from a vehicle 2. Also, the process of the flowchart is carried out, for each photographed image.

In step S302, the character information recognition unit 326 recognizes character information (first character information) appearing in the photographed image.

In step S304, the POI-and-area determination unit 327 tries to determine a target POI and a target area for the character information recognized by the character information recognition unit 326 based on the position of the vehicle 2 where the photographed image is taken. It is also possible that, as described above, the POI-and-area determination unit 327 tries to determine a target POI and a target area for the character information, based on the corresponding image additional information (the position of the vehicle 2, and the angle of field of the camera 21), the information concerning the target POIs and the target areas stored in the POI-and-area information DB 334, and the map information (GIS data) stored in the map information DB 335.

In a simpler way, it is also possible that the POI-and-area determination unit 327 tries to determine a target POI and a target area for the character information based on the position of the vehicle 2 where the photographed image corresponding to the character information is photographed, and the information concerning the target POIs and the target areas stored in the POI-and-area information DB 334.

It is also possible that, as described above, the POI-and-area determination unit 327 tries to determine a target POI and a target area, using the contents of the character information.

In step S306, the association information generation unit 328 determines whether the POI-and-area information DB 334 includes a target POI that has high relevancy with the character information recognized by the character information recognition unit 326. If the POI-and-area information DB 334 includes a target POI that has high relevancy with the character information recognized by the character information recognition unit 326, the association information generation unit 328 proceeds to step S308. If the POI-and-area information DB 334 includes no target POI that has high relevancy with the character information recognized by the character information recognition unit 326, the association information generation unit 328 proceeds to step S314.

In step S308, the association information generation unit 328 determines whether the POI-and-area information DB 334 includes a target area having high relevancy with the character information recognized by the character information recognition unit 326. If the POI-and-area information DB 334 includes a target area having high relevancy with the character information recognized by the character information recognition unit 326, the association information generation unit 328 proceeds to step S310. If the POI-and-area information DB 334 includes no target area having high relevancy with the character information recognized by the character information recognition unit 326, the association information generation unit 328 proceeds to step S312.

In step S310, the association information generation unit 328 generates information (i.e., association information) where the character information recognized by the character information recognition unit 326 is associated with the target POI and the target area determined by the POI-and-area determination unit 327, stores the generated association information in the unfixed information DB 338, and ends the current process.

In step S312, the association information generation unit 328 generates information (i.e., association information) where the character information recognized by the character information recognition unit 326 is associated with the target POI determined by the POI-and-area determination unit 327, stores the generated association information in the unfixed information DB 338, and ends the current process.

If it is determined in step S306 that the POI-and-area information DB 334 includes no target POI for the character information, the association information generation unit 328 determines whether the POI-and-area information DB 334 includes a target area having high relevancy with the character information recognized by the character information recognition unit 326, in step S314.

If the POI-and-area information DB 334 includes a target area having high relevancy with the character information recognized by the character information recognition unit 326, the association information generation unit 328 proceeds to step S316. If the POI-and-area information DB 334 includes no target area having high relevancy with the character information recognized by the character information recognition unit 326, the association information generation unit 328 proceeds to step S318.

In step S316, the association information generation unit 328 generates information (i.e., association information) where the character information recognized by the character information recognition unit 326 is associated with the target area determined by the POI-and-area determination unit 327, stores the generated association information in the unfixed information DB 338, and ends the current process.

In step S318, the association information generation unit 328 stores the character information recognized by the character information recognition unit 326 in the unfixed information DB 338, and ends the current process.

Returning to FIG. 1, the character information correction unit 329 carries out error correction on the character information included in the association information stored in the unfixed information DB 338. This is because the character information recognized based on the photographed images through the character recognition process may include errors.

The character information correction unit 329 carries out, for example, probabilistic error correction in a general-purpose method. For example, it is possible to detect and correct errors that may occur in the character information included in the association information, using an N-Gram model, an editing distance (Levenshtein distance), or the like, which is known elemental technology of statistical natural language processing. It is also possible, for example, to use a database (i.e., an OCR (Optical Character Recognition) similar character DB) concerning similar characters for which errors may likely to occur in OCR.

Also, the character information correction unit 329 detects and corrects errors that may occur in the character information included in the association information, using web crawling acquired data concerning at least either the target POIs or the target areas included in the association information.

Actually, the character information correction unit 329 acquires web crawling acquired data concerning at least either the target POIs or the target areas included in the association information, from the web crawling DB 336. Then, the character information correction unit 329 can detect and correct errors that may occur in the character information included in the association information, by extracting texts similar to the character information from the acquired web crawling acquired data concerning at least either the target POIs or the target areas included in the association information, and carrying out comparison (matching) between the character information and the extracted similar texts.

Note that, the web crawling acquired data stored in the web crawling DB 336 is web information acquired through web crawling operations on each POI and each area, and is updated periodically to correspond to the latest web information.

Also, the character information correction unit 329 detects and corrects errors that may occur in the character information included in the association information, using sound recognized data concerning at least either the target POIs or the target areas included in the association information.

Actually, the character information correction unit 329 searches the sound recognition DB 337 for the sound recognized data acquired at the same time when the photographed images corresponding to the character information included in the association information are taken near the positions where the paragraphed image are taken. Then, the character information correction unit 329 can detect and correct errors that may occur in the character information included in the association information, by extracting texts similar to the character information from the thus acquired sound recognized data, and carrying out comparison (matching) between the character information and the extracted similar texts.

The storage process unit 330 stores the association information for which the character information correction unit 329 carried out error correction on the character information, in the delivery information DB 339. Also, after receiving the information indicating the fact that the QR code read data and the QR code additional information have been received from the transmission and reception process unit 321, the storage process unit 330 stores the QR code read data in the delivery information DB 339 in a predetermined format, and stores the QR code additional information in the additional information storage unit 333.

Below, with reference to FIGS. 7 and 8, an actual example of the character information correction process of the character information correction unit 329, and a flow of a process carried out by the storage process unit 330 starting from the character information error correction and ending at storing association information in the delivery information DB 339 will be described.

Figure 7:
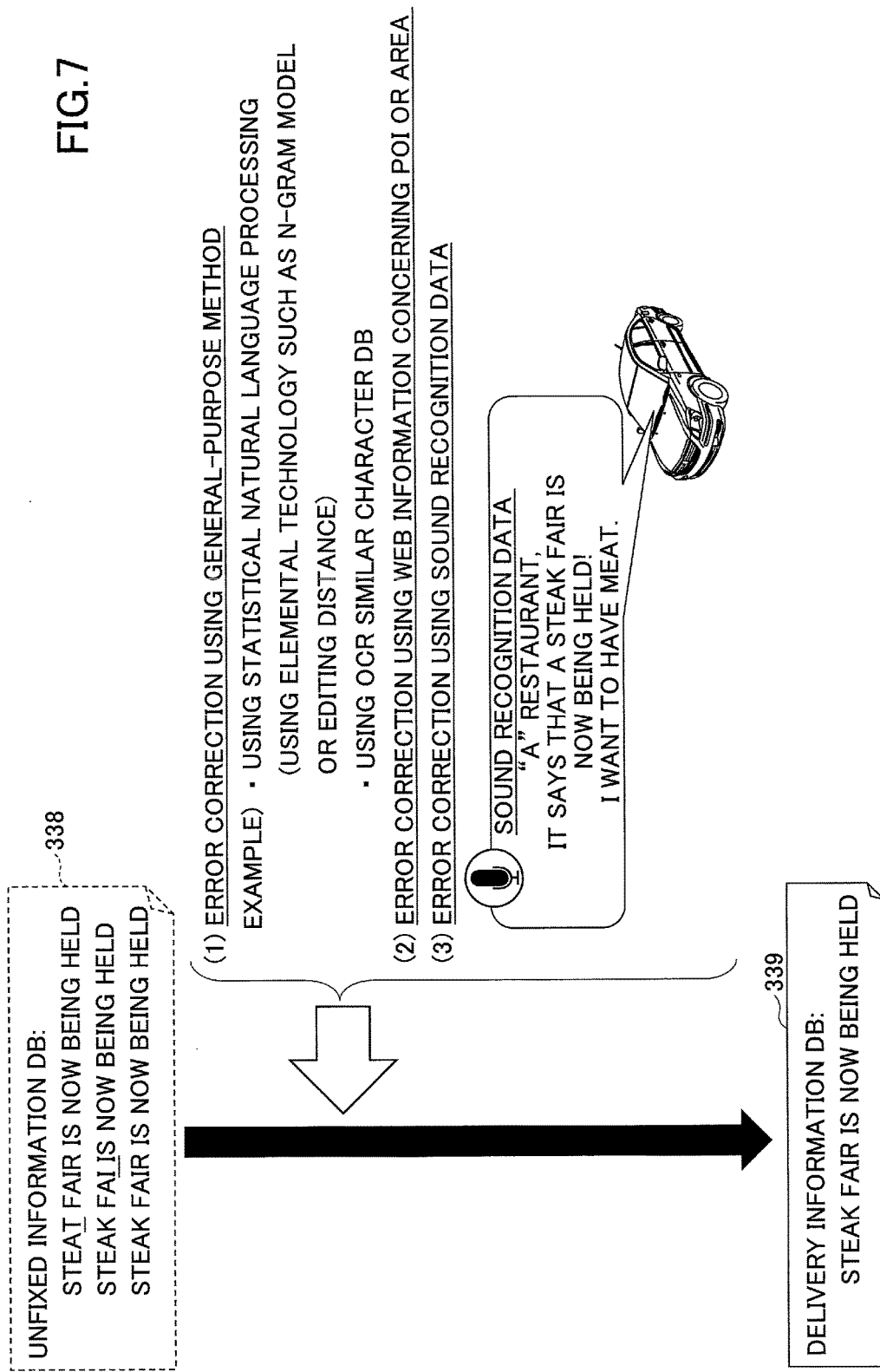
FIG. 7 illustrates an actual example of an error correction process carried out by the information center (a character information correction unit)

FIG. 7 illustrates an actual example of the error correction process of the character information correction unit 329.

As illustrated in FIG. 7, in this example, character information "STEAK FAIR IS NOW BEING HELD" printed on the banner 55 installed by the A restaurant 54 illustrated in FIG. 5A is extracted from photographed images photographed by three different vehicles 2. The corresponding three pieces of association information where the A restaurant 54 that is a target POI is associated with the corresponding three pieces of character information, respectively, are stored in the unfixed information DB 338.

Actually, the respective pieces of character information in the respective pieces of association information are: "STEAT FAIR IS NOW BEING HELD"; "STEAK FAI IS NOW BEING HELD"; and "STEAK FAIR IS NOW BEING HELD". As can be seen, the first and second pieces of character information include errors, respectively.

As described above, the character information correction unit 329 can carry out: (1) probabilistic error correction according to a general-purpose method; (2) error correction using web information acquired for the target POIs or the target areas; and (3) error correction using sound recognized data.

In particular, for example, concerning the error correction (2), the character information correction unit 329 can extract a text "steak fair is now being held" similar to the corresponding character information, based on web crawling acquired data concerning (i.e., web information acquired for) the A restaurant 54 that is the corresponding target POI.

In another example, concerning the error correction (3), if sound recognized data having the contents "A RESTAURANT, IT SAYS THAT A STEAK FAIR IS NOW BEING HELD! I WANT TO HAVE MEAT" is included in the sound recognition DB 337, as illustrated in FIG. 7, the character information correction unit 329 can extract the text "steak fair is now being held" from the sound recognized data.

Therefore, the character information correction unit 329 carries out error correction to correct the first and second pieces of character information included in the corresponding pieces of association information stored in the unfixed information DB 338 into "STEAK FAIR IS NOW BEING HELD". Then, the storage process unit 330 stores the association information for which the errors have been thus corrected in the delivery information DB 339 as the corresponding delivery information.

Figure 8:
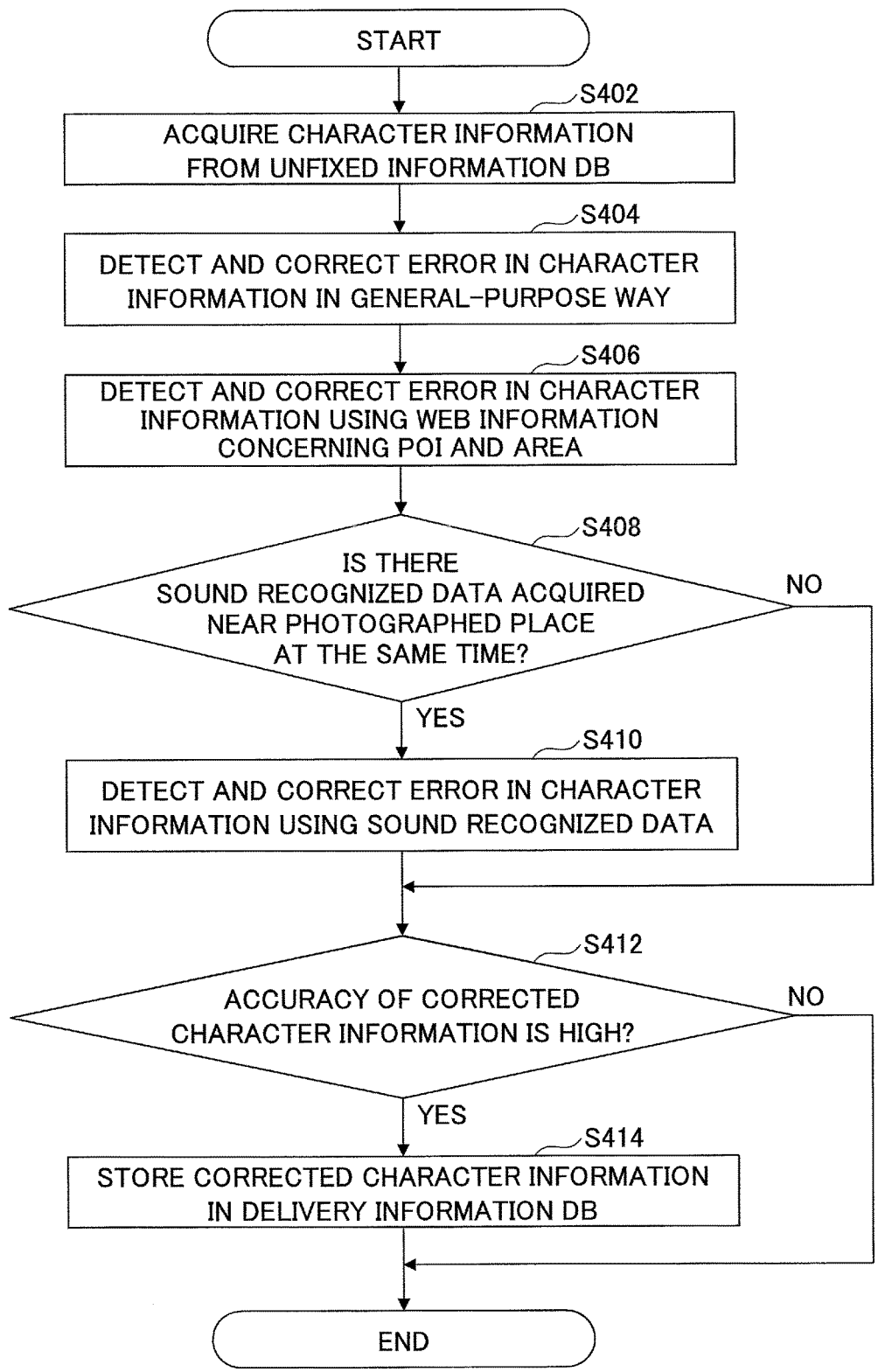
FIG. 8 is a flowchart generally illustrating one example of a process, from error correction on character information through storing association information in a delivery information DB 339 carried out by the information center (the character information correction unit and a storage process unit)

Next, FIG. 8 is a flowchart generally illustrating a flow of a process of the character information correction unit 329 and the storage process unit 330 starting from the error correction of character information and ending at storing association information in the delivery information DB 339. The process of the flowchart is carried out each time when, for example, the association information generation unit 328 stores association information in the unfixed information DB 338.

In step S402, the character information correction unit 329 acquires association information from the unfixed information DB 338.

In step S404, the character information correction unit 329 tries to detect an error from character information included in the acquired association information, in a general-purpose method (probabilistic error correction). If an error is detected, the character information correction unit 329 corrects the error.

In step S406, the character information correction unit 329 acquires the web crawling acquired data concerning the target POIs and the target areas included in the association information from the web crawling DB 336. Then, the character information correction unit 329 tries to detect an error from the character information included in the acquired association information, based on the web crawling acquired data. If an error is detected, the character information correction unit 329 corrects the error.

In step S408, the character information correction unit 329 determines whether sound recognized data acquired near the place where the photographed image corresponding to the character information included in the acquired association information is taken at the same time is included in the sound recognition DB 337. If the sound recognized data that satisfies the conditions is included in the sound recognition DB 337, the character information correction unit 329 proceeds to step S410. If no sound recognized data that satisfies the conditions is included in the sound recognition DB 337, the character information correction unit 329 proceeds to step S412.

In the step S410, the character information correction unit 329 tries to detect an error from the character information included in the acquired association information based on the acquired sound recognized data. If an error is detected, the character information correction unit 329 corrects the error.

In step S412, the character information correction unit 329 determines whether the accuracy of the corrected character information included in the acquired association information is high. A criterion to determine whether the accuracy is high can be determined from various viewpoints. For example, it is possible to increase the possibility to determine that the accuracy is high, if step S410 has been passed through.

If the accuracy of the corrected character information included in the acquired association information is high, the character information correction unit 329 proceeds to step S414. If the accuracy of the corrected character information included in the acquired association information is not high, the character information correction unit 329 ends the current process.

In step S414, the storage process unit 330 stores the acquired association information on which the character information correction unit 329 has carried out the error correction, in the delivery information DB 339, and ends the current process.

Returning to FIG. 1, the information delivery unit 331 delivers, to vehicles 2 near a target POI or a target area or the smartphones of the registered users of the vehicles 2, the delivery information concerning the target POI or the target area stored in the delivery information DB 339 through the transmission and reception process unit 321. Thus, the information delivery unit 331 delivers the association information where the character information is associated with the target POI or the target area, as well as the QR code read data concerning the target POI or the target area, to the corresponding vehicles 2 or the like. Below, with reference to FIG. 9, an actual example of giving the delivery information to a user, which is delivered by the information delivery unit 331, will be described.

Figure 9:
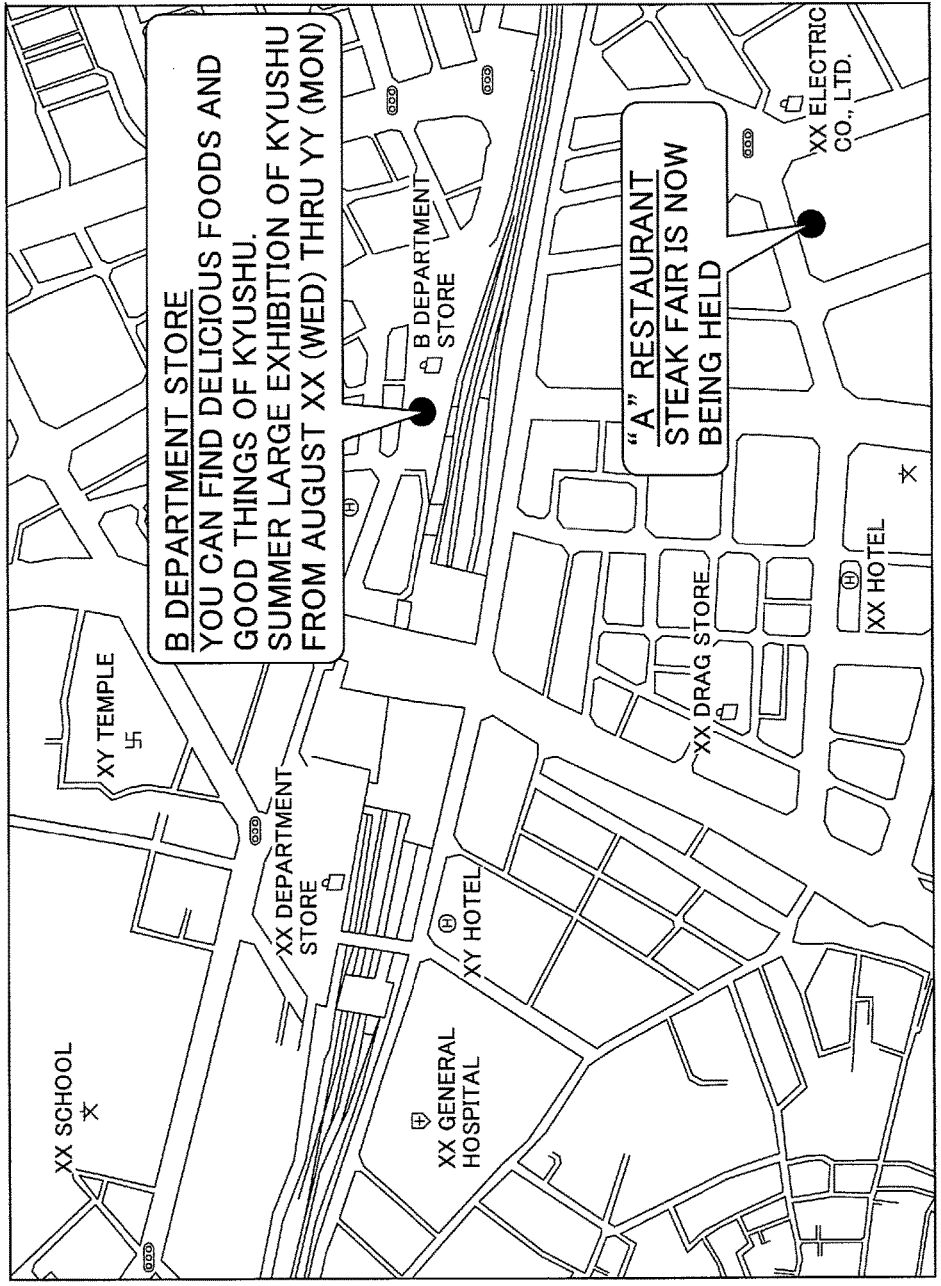
FIG. 9 illustrates one example of a method to send delivery information to a vehicle from the information center (an information delivery unit).

FIG. 9 illustrates one example of giving the delivery information to a user, which is delivered by the information delivery unit 331. FIG. 9 illustrates an image shown on the screen of a navigation apparatus of a vehicle 2 when the QR code recognized data (second character information) acquired based on the QR code recognized from the photographed image illustrated in FIG. 3A and the association information acquired based on the character information (first character information) recognized from the photographed image illustrated in FIG. 5A have been delivered to the vehicle 2.

As illustrated in FIG. 9, the message that "STEAK FAIR IS NOW BEING HELD" is displayed for the A restaurant 54 that is the target POI, and the fact that "SUMMER LARGE EXHIBITION OF KYUSHU" is held is indicated for the B department store 51. That is, instead of providing the character information and the QR code appearing in the photographed image as they are, the first character information and the second character information can be provided as the information associated with the POIs or the areas. Thus, the user can immediately understand the relevancy of the provided information with the POIs or the areas, and thus, the user can use the information more effectively.

Note that, normally, QR code read data includes information concerning the corresponding target POI or target area.

Thus, according to the embodiments, the transmission and reception process unit 321 of the information center 3 receives, from a plurality of vehicles 2, images photographed by their cameras 21 and image additional information such as the positions acquired when the photographed images are taken, and so forth.

The character information recognition unit 326 of the information center 3 recognizes the character information (the first character information) appearing in the photographed images. Also, the POI-and-area determination unit 327 determines target POIs or target areas for the character information recognized by the character information recognition unit 326 based on the positions acquired when the photographed images are taken, and the information concerning the target POIs and the target areas stored in the POI-and-area information DB 334.

The association information generation unit 328 of the information center 3 generates the association information where the character information recognized by the character information recognition unit 326 is associated with at least either the target POIs or the target areas determined by the POI-and-area determination unit 327, and the storage process unit 330 stores the generated association information in the delivery information DB 339.

Thus, it is possible to store the association information where the character information appearing in the photographed images is associated with the target POIs or the target areas determined for the character information, and it is possible to provide the association information to users.

Therefore, the users can immediately understand that the character information is associated with the particular POIs or areas because the provided association information is displayed on the displays of the vehicles or the like. As a result, the users can immediately go toward the POIs or the areas nearby. Thus, the users can effectively use the provided information.

Also, according to the embodiments, the character information correction unit 329 of the information center 3 carries out error correction on the character information included in the association information. Therefore, even if errors occur in character recognition carried out by the character information recognition unit 326, it is possible to store the more accurate association information in the delivery information DB 339 because error correction is thus carried out. That is, it is possible to provide information that is more accurate to users.

Also, according to the embodiments, the character information correction unit 329 of the information center 3 carries out error correction on the character information included in the association information based on the web crawling acquired data concerning the target POIs and the target areas included in the association information. Also, the character information correction unit 329 of the information center 3 carries out error correction on the character information included in the association information based on the sound recognized data concerning the target POIs and the target areas. Thus, it is possible to carry out error correction on the character information included in the association information, using the web information acquired for the target POIs and the target areas included in the association information or the sound recognized data (for example, text data corresponding to murmurs for providing information of the users of vehicles 2). Therefore, it is possible to precisely correct errors that may occur in character recognition carried out by the character information recognition unit 326, which errors may be difficult to deal with through general-purpose error correction technology (for example, for a case where error correction is carried out on character information that includes an intentional typographical error, character information that includes a coined word, or the like).

Also, according to the embodiments, the QR code reading unit 243 of each vehicle 2 recognizes a QR code appearing in a photographed image, and analyzes the QR code to acquire QR code read data (second character information). Then, the storage process unit 330 of the information center 3 stores the QR code read data in the delivery information DB 339. Thus, the QR code read data acquired through analysis of the contents of the QR code appearing in the photographed image is stored in the delivery information DB 339, and it is possible to provide the QR code read data to users. Also, in many cases, QR code read data includes, as illustrated in FIG. 3B, information concerning a POI or an area, and therefore, it is possible to provide the QR code read data as information concerning the POI or the area. Also, for example, if a photographed image is provided as it is to a user, the user himself or herself reads a QR code appearing in the photographed image using an application of a smartphone. In contrast thereto, according to the embodiments, the user himself or herself need not read a QR code using an application of a smartphone, for example, and therefore, it is possible to improve the convenience of the user.

Thus, according to the embodiments, a position of each vehicle is acquired, and an image of a nearby outside taken by a camera of the vehicle and a piece of information of the position of the vehicle acquired when the image is taken are transmitted from the vehicle to an information center that is communicatable wirelessly with the vehicle. The information center receives the images and the pieces of information that indicate positions of the vehicles, respectively, and recognizes pieces of first character information appearing in the photographed images, respectively. Based on the received pieces of information of the positions of the vehicles as well as at least either points of interest or areas stored as collection target information, the information center determines at least either points of interest or areas for the recognized pieces of first character information, respectively, and stores, in a storage unit, pieces of association information where the pieces of first character information are associated with the determined at least either points of interest or areas, respectively.

Thus, the pieces of association information where the pieces of first character information appearing in the photographed images are associated with the points of interest or the areas determined for the pieces of first character information are stored, and are provided to users. Therefore, when the provided pieces of association information are displayed on displays of the respective vehicles, or the like, the users can immediately understand that the pieces of first character information relate to the particular points of interest or area. Therefore, the users can actually go to the points of interest or areas nearby immediately, and thus, it is possible to effectively use the provided information. Thus, it is possible to store the information appearing in the photographed images taken by the cameras of the vehicles in such a manner that it is possible to more effectively use the information.

The information center corrects errors in the pieces of first character information included in the pieces of association information.

Therefore, even if errors occur when the pieces of first character information are recognized from the images, the errors are corrected, and thus, the more accurate pieces of association information can be stored. Thus, it is possible to provide the more accurate information to the users.

When the information center corrects errors occurring when the pieces of first character information are recognized, the web information acquired for the at least either points of interest or areas is used. Therefore, it is possible to correct errors in the pieces of association information using the web information acquired for the points of interest or areas included in the pieces of association information. Therefore, even if errors occurring when the pieces of first character information are recognized are those which are difficult to correct through general-purpose error correction technology, i.e., in cases where the character information includes intentional typographical errors, the character information includes coined words, or the like, it is possible to precisely correct the errors.

Each vehicle or the information center recognizes QR codes appearing in the images, and analyzes the recognized QR codes to acquire pieces of second character information, respectively. Then, the vehicle or the information center stores the pieces of second character information.

Thus, the pieces of second character information acquired from analyzing the contents of the QR codes appearing in the images are stored and provided to the users. In many cases, the pieces of second character information include information concerning the corresponding points of interest or areas. Therefore, it is possible to provide the information as information concerning the particular points of interest of areas to the users. For example, if a photographed image is provided to a user as it is, the user himself or herself reads the QR code appearing in the photographed image using a corresponding application, or the like. In contrast thereto, according to the embodiments, the user is free from such work of operating a corresponding application to read a QR code by himself or herself. Thus, it is possible to improve the convenience of the users.

Thus, the information collection systems and the information centers have been described in the embodiments. However, the present disclosure is not limited to these embodiments. Various modifications and improvements can be made within the scope of the present disclosure.

For example, in the above-described embodiments, the POI-and-area determination unit 327 tries to determine both target POIs and target areas for the character information. However, it is also possible that the POI-and-area determination unit 327 tries to determine either target POIs or target areas for the character information. In this case, it is sufficient that the POI-and-area information DB 334 stores information concerning either targets POI or target areas. Also, the association information generation unit 328 associates the character information recognized by the character information recognition unit 326 with either the target POIs or the target areas determined by the POI-and-area determination unit 327.

Also, in the above-described embodiments, the QR code reading unit 243 is included in each of the vehicles 2. However, it is also possible that the QR code reading unit 243 is included in the information center 3, as shown in FIG. 1 indicated by a block 243 of a broken line.

Also, in the above-described embodiments, the character information correction unit 329 is used. However, the character information correction unit 329 can be omitted. In this case, the storage process unit 330 simply stores the association information generated by the association information generation unit 328 in the delivery information DB 339 as delivery information as it is.

According to the embodiments, it is possible to provide information collection systems with which it is possible to store information appearing in photographed images taken by cameras of vehicles in such a manner that users can use the information more effectively.

What is claimed is:
1. An information collection system comprising:
a plurality of vehicles, each vehicle of the vehicles including one or more processors configured to
acquire a position of the vehicle, and
transmit an image of a nearby outside taken by a camera included in the vehicle and a piece of information of the position of the vehicle acquired when the image is taken; and
an information center wirelessly communicatable with the vehicles, respectively, the information center including one or more processors configured to
receive the images and the pieces of information of the positions of the vehicles from the vehicles, respectively,
recognize pieces of first character information appearing in the received images, respectively,
based on the received pieces of information of the positions of the vehicles as well as at least either points of interest or areas stored as collection target information, determine at least either points of interest or areas for the recognized pieces of first character information, respectively,
store, in a storage unit, pieces of association information where the pieces of first character information are associated with the determined at least either points of interest or areas, respectively, and
provide the association information to one or more of the vehicles, wherein the association information is different from the pieces of first character information.
2. The information collection system according to claim 1, wherein
the one or more processors of the information center are further configured to
correct errors in the pieces of first character information included in the pieces of association information.
3. The information collection system according to claim 2, wherein
the one or more processors of the information center are further configured to
correct errors in the pieces of first character information included in the pieces of association information based on web information acquired for the at least either points of interest or areas included in the pieces of association information.
4. The information collection system according to claim 1, wherein
either the one or more processors of each of the vehicles or the one or more processors of the information center are further configured to
recognize QR codes appearing in the images, and
analyze the recognized QR codes to acquire pieces of second character information, respectively; and
the one or more processors of the information center are further configured to
store the pieces of second character information in the storage unit.
5. The information collection system according to claim 2, wherein
either the one or more processors of each of the vehicles or the one or more processors of the information center are further configured to
recognize QR codes appearing in the images, and
analyze the recognized QR codes to acquire pieces of second character information, respectively; and
the one or more processors of the information center are further configured to store the pieces of second character information in the storage unit.

6. The information collection system according to claim 3, wherein
either the one or more processors of each of the vehicles or the one or more processors of the information center are further configured to
recognize QR codes appearing in the images, and
analyze the recognized QR codes to acquire pieces of second character information, respectively; and
the one or more processors of the information center are further configured to
store the pieces of second character information in the storage unit.

7. An information center wirelessly communicatable with a plurality of vehicles, respectively, the information center comprising one or more processors configured to
receive images of nearby outsides taken by cameras of the vehicles, respectively, and pieces of information of respective positions of the vehicles acquired when the images are taken, respectively,
recognize pieces of first character information appearing in the received images, respectively,
based on the received pieces of information of the positions of the vehicles as well as at least either points of interest or areas stored as collection target information, determine at least either points of interest or areas for the recognized pieces of first character information, respectively,
store pieces of association information where the pieces of first character information are associated with the determined at least either points of interest or areas, respectively, and
provide the association information to one or more of the vehicles, wherein the association information is different from the pieces of first character information.

8. An information collection system comprising:
a plurality of vehicles, each vehicle of the vehicles including one or more processors configured to
acquire a position of the vehicle, and
transmit an image of a nearby outside taken by a camera included in the vehicle and a piece of information of the position of the vehicle acquired when the image is taken; and
an information center wirelessly communicatable with the vehicles, respectively, the information center including one or more processors configured to
receive the images and the pieces of information of the positions of the vehicles from the vehicles, respectively,
recognize pieces of first character information appearing in the received images, respectively,
based on the received pieces of information of the positions of the vehicles as well as at least either points of interest or areas stored as collection target information, determine at least either points of interest or areas for the recognized pieces of first character information, respectively, and
store, in a storage unit, pieces of association information where the pieces of first character information are associated with the determined at least either points of interest or areas, respectively,
wherein
either the one or more processors of each of the vehicles or the one or more processors of the information center are further configured to
recognize QR codes appearing in the images, and
analyze the recognized QR codes to acquire pieces of second character information, respectively; and
the one or more processors of the information center are further configured to store the pieces of second character information in the storage unit.

9. The information collection system according to claim 8, wherein
the one or more processors of the information center are further configured to
correct errors in the pieces of first character information included in the pieces of association information.

10. The information collection system according to claim 9, wherein
the one or more processors of the information center are further configured to
correct errors in the pieces of first character information included in the pieces of association information based on web information acquired for the at least either points of interest or areas included in the pieces of association information.

* * * * *